United States Patent
Bridge

(10) Patent No.: US 6,535,400 B2
(45) Date of Patent: Mar. 18, 2003

(54) CONTROL CIRCUIT FOR SYNCHRONOUS RECTIFIERS IN DC/DC CONVERTERS TO REDUCE BODY DIODE CONDUCTION LOSSES

(75) Inventor: Christopher David Bridge, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/024,870

(22) Filed: Dec. 19, 2001

(65) Prior Publication Data
US 2002/0141209 A1 Oct. 3, 2002

Related U.S. Application Data
(60) Provisional application No. 60/280,194, filed on Mar. 30, 2001.

(51) Int. Cl.[7] ............................................... H02M 3/335
(52) U.S. Cl. ..................................... 363/21.06; 363/89
(58) Field of Search ................................ 363/20, 21.01, 363/21.04, 21.05, 21.06, 44, 52, 84, 89, 127

(56) References Cited
U.S. PATENT DOCUMENTS

| | | | | |
|---|---|---|---|---|
| 6,101,104 A | * | 8/2000 | Eng ........................ 363/21.06 |
| 6,128,206 A | * | 10/2000 | Sun et al. .................... 363/127 |
| 6,130,828 A | * | 10/2000 | Rozman ................... 363/21.06 |
| 6,288,918 B1 | * | 9/2001 | Tarodo et al. ................. 363/44 |
| 6,301,128 B1 | * | 10/2001 | Jang et al. ..................... 363/17 |
| RE37,510 E | * | 1/2002 | Bowman et al. ............... 363/15 |
| 6,418,039 B2 | * | 7/2002 | Lentini et al. ............ 363/21.06 |
| 6,426,884 B1 | * | 7/2002 | Sun .............................. 363/17 |
| 6,466,462 B2 | * | 10/2002 | Nishiyama et al. ....... 363/21.11 |
| 6,473,317 B1 | * | 10/2002 | Simopoulos ............. 363/21.06 |

* cited by examiner

Primary Examiner—Adolf Deneke Berhane
(74) Attorney, Agent, or Firm—W. Daniel Swayze, Jr.; W. James Brady; Frederick J. Telecky, Jr.

(57) ABSTRACT

A controller for a switching power supply having first and second synchronous rectifiers that minimizes the reverse recovery time and body diode conduction losses of each of the synchronous rectifiers. The controller includes a first controller that predicts the optimal turn-on and turn-off time of the first synchronous rectifier as a function of voltage measurements of the previous switching cycle and the timing of the pulse width modulator signal in the current switching cycle. The controller also includes a second controller that predicts the optimal turn-on and turn-off time of the second synchronous rectifier as a function of voltage measurements of the previous switching cycle and the timing of the pulse width modulator signal in the current switching cycle.

11 Claims, 12 Drawing Sheets

CONTROL CIRCUIT FOR SYNCHRONOUS RECTIFIERS IN DC/DC CONVERTERS TO REDUCE BODY DIODE CONDUCTION LOSSES

CROSS REFERENCE TO RELATED APPLICATIONS

This application claims priority under 35 U.S.C. §119(e) to Provisional Patent Application Serial No. 60/280,194 filed Mar. 30, 2001; the disclosure of which is incorporated by reference herein.

STATEMENT REGARDING FEDERALLY SPONSORED RESEARCH OR DEVELOPMENT

N/A

BACKGROUND OF THE INVENTION

The fields of power electronics, and power supplies in general, are concerned with the processing of electrical power using electronic devices. One class of power supply that is commonly used to provide power for electronic devices such as personal computers, laptop computers, personal communication devices, and personal digital assistants is referred to as a DC/DC switching converter power supply. In general, a DC/DC switching converter power supply contains a raw power input port that is typically coupled to a DC power source such as a battery and controller. The raw DC input power is processed according to one or more control signals provided by the controller and yields a conditioned output power signal. In particular, a DC/DC converter converts a DC input voltage to a conditioned DC output voltage that may have a larger or smaller voltage magnitude. One type of DC/DC converter is a forward converter illustrated in FIG. 1. Typically, a DC/DC forward converter is used to provide a DC output voltage that has an output magnitude less than the input magnitude. In particular, as depicted in FIG. 1, a typical prior art forward converter 100 includes a raw DC voltage source 107 input between terminals 101 and 105 and coupled to the primary winding 103 of a power transformer 102. A transformer reset circuit 104 is provided to demagnetize the power transformer during periods when no current is present in the primary coil. A first switch 106, which is typically a power switching MOS transistor, is coupled between the primary winding of the power transformer 102 and the reference terminal of the voltage input 105. The secondary coil 109 of the power transformer 102 is coupled to switching diodes 110 and 112, inductor 114, and output capacitor 116, wherein zn output voltage is developed between terminals 117 and 119. If the first electronic switching module is not a power MOSFET switch a protection diode 108 may be placed across the first electronic switching module to provide a discharge path for the inductance in series around the switching module 106. A power MOSFET does not need a protection diode due to a parasitic diode that is inherently created due to the semiconductor structure of the MOSFET.

When an input pulse is applied to the primary winding 103 of the transformer 102 a voltage is induced in the secondary winding 109 of the power transformer 102, the polarity of which is indicated by the respective dots shown on the windings in FIG. 1. Accordingly, during a positive going pulse, switching diode 110 turns on and a circuit is formed that includes the secondary winding 109 of transformer 102, inductor 114, capacitor 116 and switching diode 110. During the positive going pulse, inductor current $I_L$ 120 flows into the inductor from the secondary winding. The inductor current 120 is equal to the integral of the voltage applied to the inductor divided by the inductance thereof. Accordingly, for a square wave pulse having a constant amplitude, the inductor current 120 will begin to increase in a substantially ramp like manner.

Similarly, when the first switching module 106 turns off the input voltage pulse, switching diode 110 turns off and the inductor current 120 begins to decrease as a linear function. Switching diode 112 will turn on when the voltage at node 121 has fallen below the threshold voltage of diode 112. When conducting, switching diode 112 turns on to complete the circuit that includes switching diode 112, inductor 114 and output capacitor 116.

The output voltage provided between output terminals 117 and 119 is a function of the amplitude of the voltage input pulses provided by the input DC voltage source 107, the turns ratio of power transformer 102, the switching frequency of the first switching module 106, and the duty cycle of the input pulses. For the forward converter illustrated in FIG. 1, the output voltage is less than or equal to the voltage across the secondary winding of the power transformer.

The switching diodes 112 and 110 each have a small non-zero resistance when forward biased, i.e., when the diodes are turned on and are conducting. When any current is flowing through the respective diode, the non-zero resistance results in a voltage drop being generated across the switching diode, resulting in a diode conduction loss equal to V*I, where V is the voltage drop and I is the current flowing through the diode. For a typical switching Schottky diode, this diode voltage drop may be as high as 0.4 volts. Because the switching diodes 110 and 112 are in each of the two circuit paths, the output voltage, which is less than the input voltage to begin with, is further reduced by the diode voltage drop. In some DC/DC converters, the diode conduction loss can contribute significantly to the overall power loss. In low output voltage applications the diode conduction loss can be particularly serious. Thus, as the supply voltages for next generation electronic equipment become lower, the forward conduction loss of the switching diodes becomes increasingly significant.

Many components used in current electronic products require 3.3 volts, and in some cases, most notably microprocessors, the voltage requirements have dropped below 2 volts. As this trend of lower supply voltages continues into the future, many electronic devices will be designed to operate at 1 volt or less. As an example of the problems associated with Schottky switching diodes in DC/DC power supplies, a power supply having an output voltage of 5 volts will have approximately 92% to 93% efficiency. However, as the output voltage drops the efficiency of the diode rectifiers drops as well. At 3.3 volts for example, the efficiency of the diode rectifiers is approximately 88%, at 2 volts the efficiency is approximately 83%, and at 1 volt the efficiency is less than 75%.

To ameliorate this condition, the switching diodes 110 and 112 used in FIG. 1 are often replaced with other electronic switching modules that may include single or multiple MOSFETs, bi-polar transistors, or other semiconductor switches such as thyristors or SCR's. Typically, these electronic switches are referred to as synchronous rectifiers since they are switched on and off synchronously with the switching cycles of the first switching mode to rectify the pulsed DC voltages induced in the secondary coil 109. Typically, synchronous rectifiers are large channel area power MOSFET switches that are able to clamp the various switching nodes to 0.1 volt or less thus reducing the forward conduction loss by a factor of 4 or more when compared to Schottky switching diodes. Synchronous rectifiers are typically driven using one of two methods. In the first method, a control circuit is used to drive the synchronous rectifiers. In this case, the trade off in using a switching diode or a MOSFET rectifier is whether the power needed to drive the MOSFET gate cancels the efficiency gained from a reduced forward voltage drop.

FIG. 2 depicts the second method for driving a pair of synchronous rectifiers in which the synchronous rectifiers are self-driven. A self-driven system does not suffer from the energy losses described above since the energy necessary to drive the gates of the two synchronous MOSFET rectifiers is returned to the inductor or transformer. In particular, a forward converter 200 uses MOSFET switches 210 and 214 to provide the necessary current paths to rectify the incoming power pulses. The efficiency gain of the synchronous rectifiers depends on the load current, the input battery voltage, the desired output voltage, the switching frequency of the first switching module, and the characteristics of the MOSFET switches. Typically in a DC/DC converter, a lower output voltage and higher load current will militate toward the use of synchronous rectification.

Synchronous rectification using MOSFET devices, however, is not without problems. In particular, MOSFET synchronous rectifiers have two disadvantages that decrease the overall efficiency of the power supply. The first problem associated with the MOSFET synchronous rectifiers is known as the reverse recovery condition. The construction of a MOSFET transistor results in a parasitic PN junction between the source-channel-drain regions and the body of the MOSFET. This parasitic PN junction forms a body diode that conducts current between the MOSFET structures and the body during the reverse recovery period when the voltage on the drain has been reduced and the parasitic diode is forward biased. This body diode conduction can result in significant power loss as described above with respect to the synchronous rectifiers used in the forward converter depicted in FIG. 2. Reverse recovery of a MOSFET switch occurs due to the stored junction charge of the MOSFET body diode caused by the current flowing therethrough. Because this junction charge cannot be removed instantaneously, the anode to cathode voltage will remain constant as the MOSFET body diode is switched from forward to reverse bias. At the time the switch occurs, the current through the junction reverses direction and stays at a constant level for a period commonly referred to as the storage time, $D_x$. Physically, the storage time is the time it takes the electrons to move from the P-material back to the N-material and for the holes to move from the N-material to the P-material is determined by the geometry of the junction. During this period the MOSFET is essentially a short circuit. After the storage time has elapsed, the body diode will turn off and the current will then decrease to the reverse leakage current value of the MOSFET. The time for the current to decrease to the reverse leakage current is commonly referred to as the transition time and the sum of the storage time and the transition time is the reverse recovery time. Physically, the transition time is the time required for the electrons to recombine at the anode, and the holes to recombine at the cathode until there are no more of the original stored carriers left. The transition time of the junction is a function of both the geometry and the doping levels of the junction.

The forward converter 200 depicted in FIG. 2 utilizes a self-drive method for the synchronous rectifiers, in which the gates are coupled to one terminal or the other of the secondary coil 205 of the transformer 202. Because of the inductors and capacitors in the power supply, the voltages and currents do not change instantaneously. As a result of the inherent dynamics of the system, both MOSFET switches 210 and 214 can be conducting simultaneously, wherein one MOSFET switch is turned on and conducting, and the other MOSFET switch is in the reverse recovery period and the body diode and channel are both conducting current.

Another issue with a self-driven synchronous system is the variation in the channel resistance of the MOSFET due to voltage variations in the $V_{GS}$ voltage. The varying channel resistance results in a changing loss and a variation in the output current and voltage.

Therefore, it would be advantageous to provide a control system for a DC/DC converter that minimizes the reverse recovery and parasitic body diode of the synchronous rectifiers used therein.

BRIEF SUMMARY OF THE INVENTION

A control system for controlling a switched mode power supply including first and second synchronous rectifiers is disclosed. The control system provides control signals to each of the synchronous rectifiers such that the body diode conduction of the synchronous rectifier being switched is minimized. The control system achieves this by shifting in time the portion of the control signal turning on the first synchronous rectifier, i.e., the rising edge of the first control pulse, such that the body diode is not forward biased, and hence does not conduct. Similarly, the control system provides the control signals necessary to turn-off the first synchronous rectifier by shifting in time the portion of the control signal turning off the first synchronous rectifier, i.e., the trailing edge of the first control pulse, such that the forward biasing of the body diode is minimized. The control system controls the turn-on of the second synchronous rectifier by detecting the conduction of the body diode of the second synchronous rectifier and adjusting the turn-on signal to minimize or eliminate this conduction period. The control system controls the turn-off of the second synchronous rectifier in a similar manner to the first synchronous rectifier. In particular, the control system shifts in time the turn-off signal to the second synchronous rectifier to coincide with the turning-on of the first synchronous rectifier. This avoids allowing the body diode of the second synchronous rectifier to conduct simultaneously with the conduction of the first synchronous rectifier.

In one embodiment the first and second synchronous rectifiers each have first, second, and control electrodes, and the switched mode power supply includes a pulse width modulator (PWM) providing a plurality of PWM signal pulses each PWM signal pulse corresponding to a switching cycle. The control system includes a first control module that is configured and arranged to provide a first control signal having a turn-on portion and a turn-off portion to the control electrode of the first synchronous rectifier. The first control module receives three input signals: the first input is a first measurement signal indicative of the voltage magnitude between the first and third terminals of the first synchronous rectifier. The second input is a second measurement signal indicative of the magnitude of the first control signal, and the third input is the PWM signal pulse corresponding to the current switching cycle. The first control module is configured and arranged to predict the optimal turn-on time of the first rectifier as a function of the first and second measurement signals of the previous switching cycle, and the pulse signal of the current switching cycle. The first control module is configured and arranged to provide the turn-on portion of the first control signal to the control terminal of the first synchronous rectifier. Similarly, the first control module is further operative to predict the optimal turn-off time for the first synchronous rectifier as a function of the previous switching cycle, and the pulse signal of the current switching cycle. The first control module is configured and arranged to provide the turn-off portion of the first control signal to the control terminal of the first synchronous rectifier. In this way the conduction of the parasitic body diode of the second synchronous rectifier is substantially minimized.

The controller includes a second control module to provide a second control signal to the control electrode of the second synchronous rectifier. The second control module receives a third measurement signal indicative of the voltage between the first and third terminals of the first synchronous rectifier, a pulse signal indicative of the PWM signal corresponding to the current switching cycle, and the first measurement signal. The first control module is configured and arranged to predict the optimal turn-off time for the second synchronous rectifier as a function of the first, second and third measurement signals of the previous switching cycle and the pulse signal of the current switching cycle. The second control module is operative to provide the turn-off portion of the second control signal to the control terminal of the second synchronous rectifier. The second control module is further configured and arranged to predict the optimal turn-on time for the second synchronous detector by detecting when the second measurement signal has first increased above a first threshold level and has subsequently decreased beneath a second threshold level. The second control module is operative to provide the turn-on portion of the second control signal to the control terminal of the second synchronous rectifier, minimizing the conduction of the parasitic body diode of the second synchronous rectifier.

Other forms, features, and aspects of the above-described methods and system are described in the detailed description that follows.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
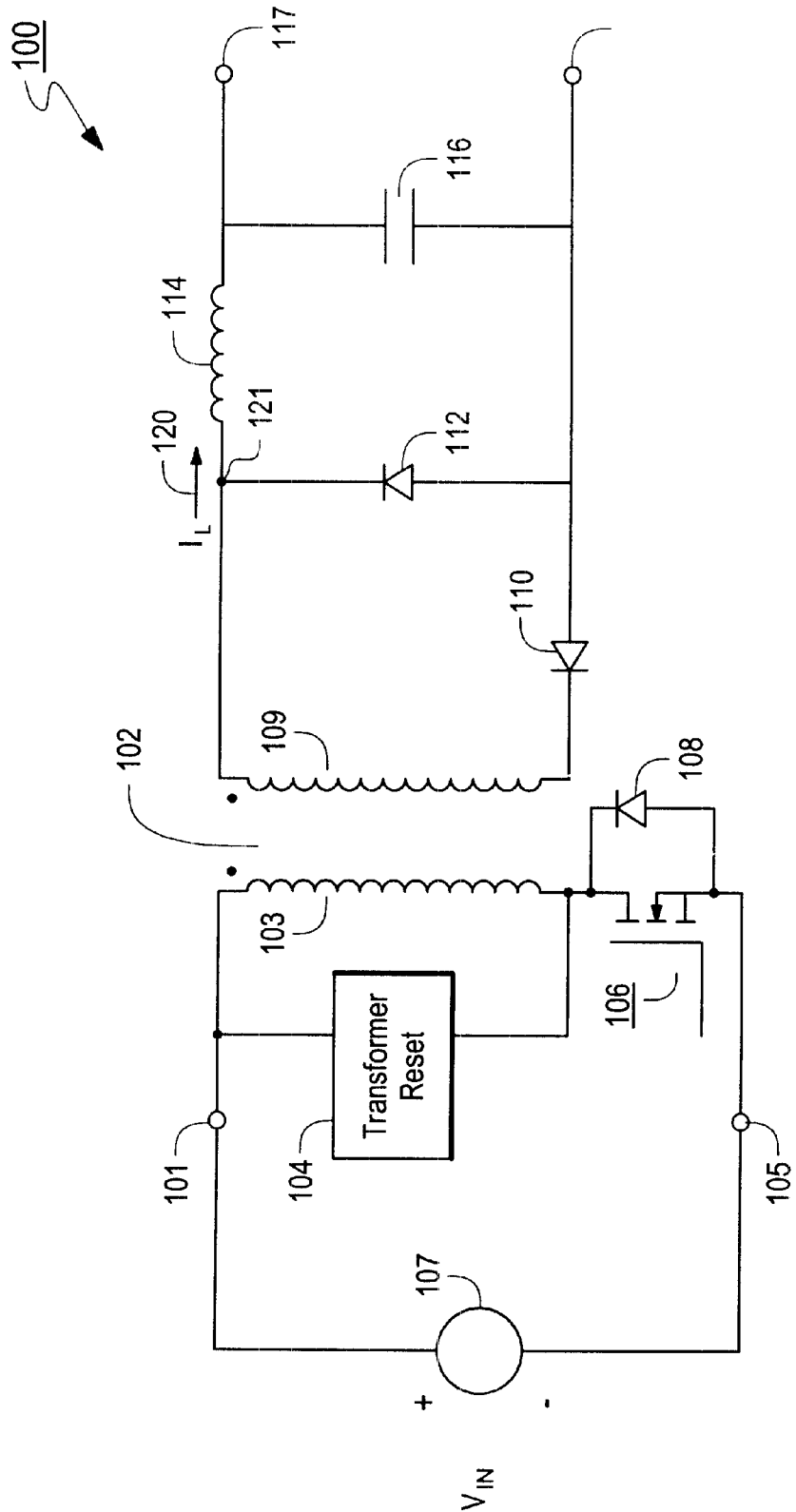
FIG. 1 is a schematic diagram of a prior art forward converter power supply.
Figure 2:
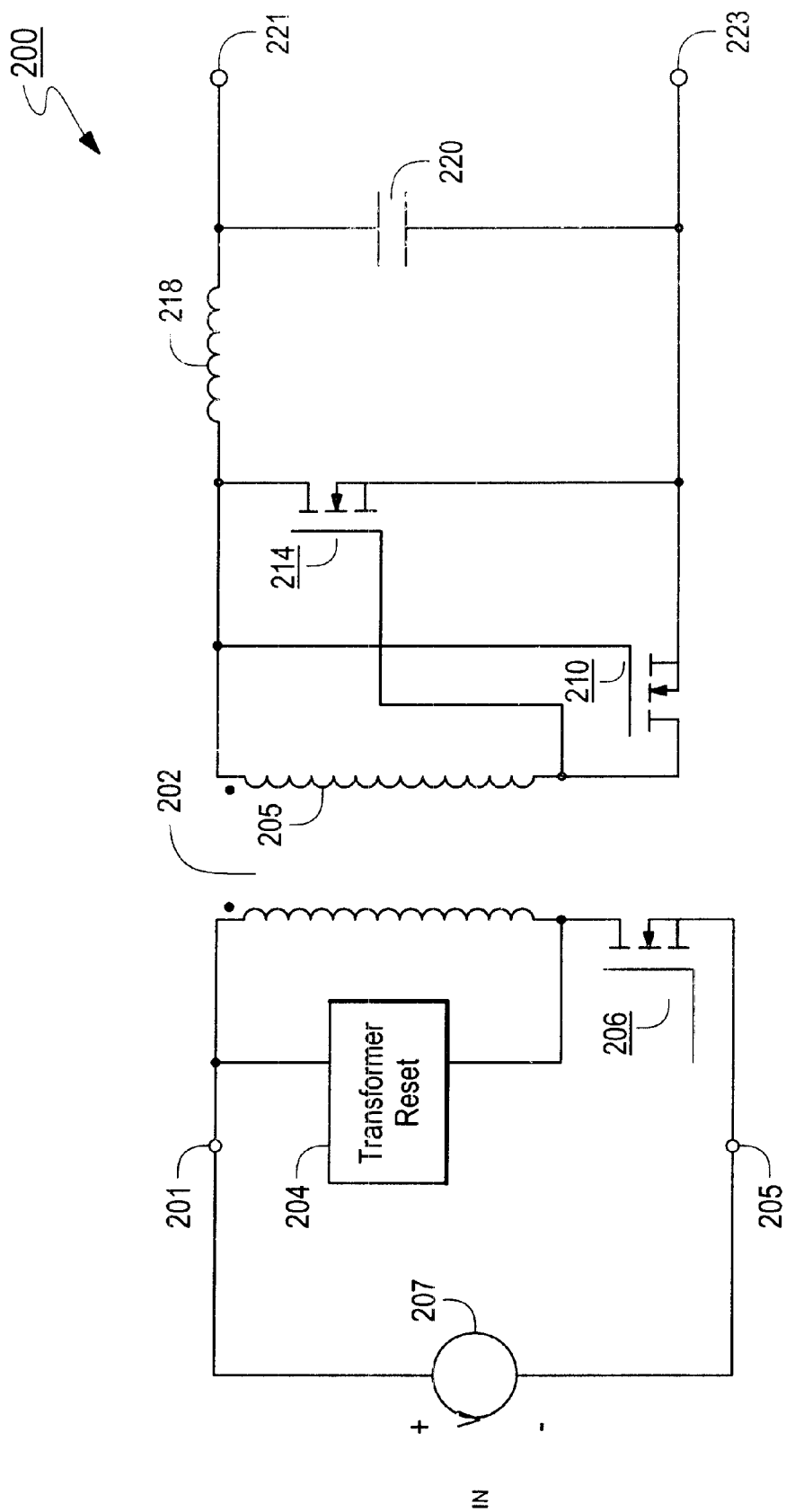
FIG. 2 is a schematic diagram of a prior art forward converter using self-excitation.
Figure 3:
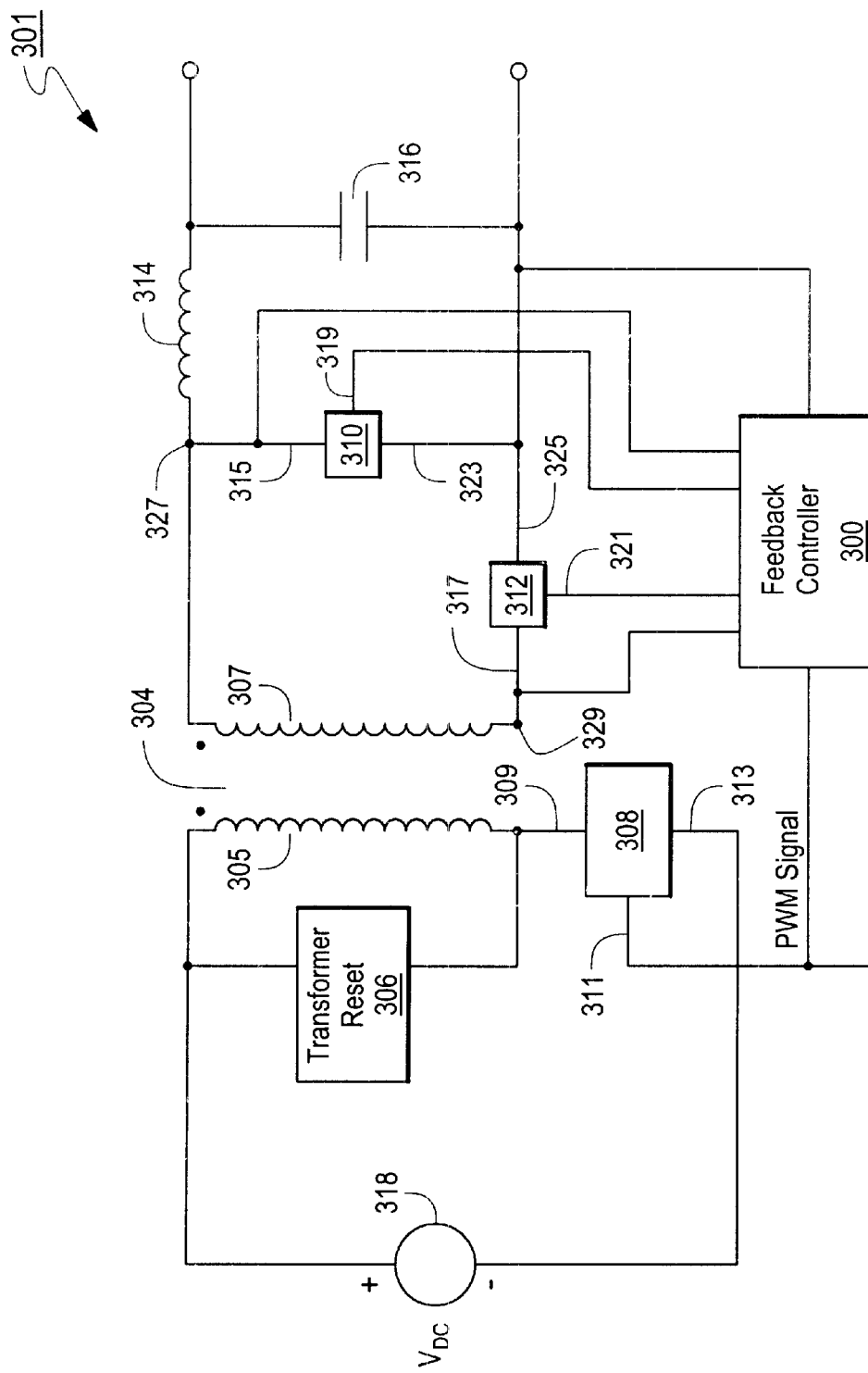
FIG. 3 is a block diagram of a forward converter using a controller incorporating the present invention.

FIG. 3 depicts a forward converter switching power supply 301. The embodiments described herein use MOSFET switching transistors although other electronic switching modules utilizing one or more MOSFETs, BJTs, SCRs, IGBTs, or thyristors may be used. The forward converter 301 includes a transformer 304 having a primary coil 305 and a secondary coil 307. The primary coil 305 is connected to a first switch 308, which controls the flow of current in the primary coil 305. In this way, the first switch 308 provides pulses of power to the primary coil 305 from a DC power source 318. A reset/demagnetizer 306 is connected across the primary coil 305 to demagnetize and reset the primary coil 305 when switch 308 is switched off. This demagnetization prevents a build up of unwanted magnetic flux coil 305 so that the flux is returned to the same level as it was at the beginning of the cycle.

The first switch 308 includes a first terminal 309, a control terminal 311, and a second terminal 313. Typically, the first switch 308 is a power MOSFET switching transistor and, accordingly, the first terminal is the drain, the control terminal is the gate and the second terminal is the source. A control signal is provided to the control terminal 311 that is greater than the first turn-on threshold value such that the switch 308 will allow current to flow therethrough. When the control signal falls below the first turn-on threshold value, the switch 308 will open and no current will flow. The control signal provided to the first switch 308 is typically provided by a pulse width modulator (PWM) 302 that operates as a feedback control system providing PWM signal pulses to the first switching module 308 in response to measurements made of the output voltage or current to maintain a constant voltage or current output. Each PWM signal pulse defines a switching cycle. It is interesting to note that the controller described herein does not require a pulse width modulator (PWM) in order to function, and if a PWM is used, the control method of the PWM does not affect the operation of the controller described herein.

The forward converter 301 further includes an output side including a secondary coil 307 of the transformer 304 and second and third switches 310 and 312 connected as synchronous rectifiers to the secondary coil 307. The second and third switches 310 and 312 each include a first terminal 315 and 317 respectively, a control terminal 319 and 321 respectively, and a second terminal 323 and 325 respectively. The first terminal 315 of the second switch 310 is connected to a first terminal 327 of the secondary coil 307 and the second terminal 323 of the second switch 310 is connected to the second terminal 325 of the third switch 312. The first terminal 317 of the third switch 312 is connected to the second terminal 329 of the secondary coil 307. An inductor 314 and a capacitor 316 are connected in series with one another and across the first terminal 315 and second terminal 323 of the second switch 310. The output voltage is taken across the capacitor 316. Preferably, the second and third switching modules are power MOSFET switching transistors and the first terminal of each is the drain, the control terminal is the gate and the second terminal is the source The control terminal 319 of the second switch 310 and the control terminal 321 of the third switch 312 are connected to a feedback controller 300 and receive control signals therefrom. As will be explained in more detail below, the feedback controller 300 receives various inputs from the forward converter 301. In the illustrative embodiment, the feedback controller 300 receives a first voltage measurement of the voltage across the first and second terminals 315 and 323 of the second switching module 310. The controller further receives a second voltage measurement of the voltage across the first and second terminals 317 and 325 of the third switching module. In addition, the feedback controller receives the PWM signal pulses provided to the first switch 308 from the PWM 302.

The controller 300 receives these inputs, and the PWM signal pulses, and is operative to provide control signals to the respective control terminals to turn-on and turn-off the respective switches in a synchronous manner. Thus, the controller 300 provides for the rectification of the pulses induced in the secondary coil 307 of the transformer 304 from the primary coil 305.

Figure 4A:
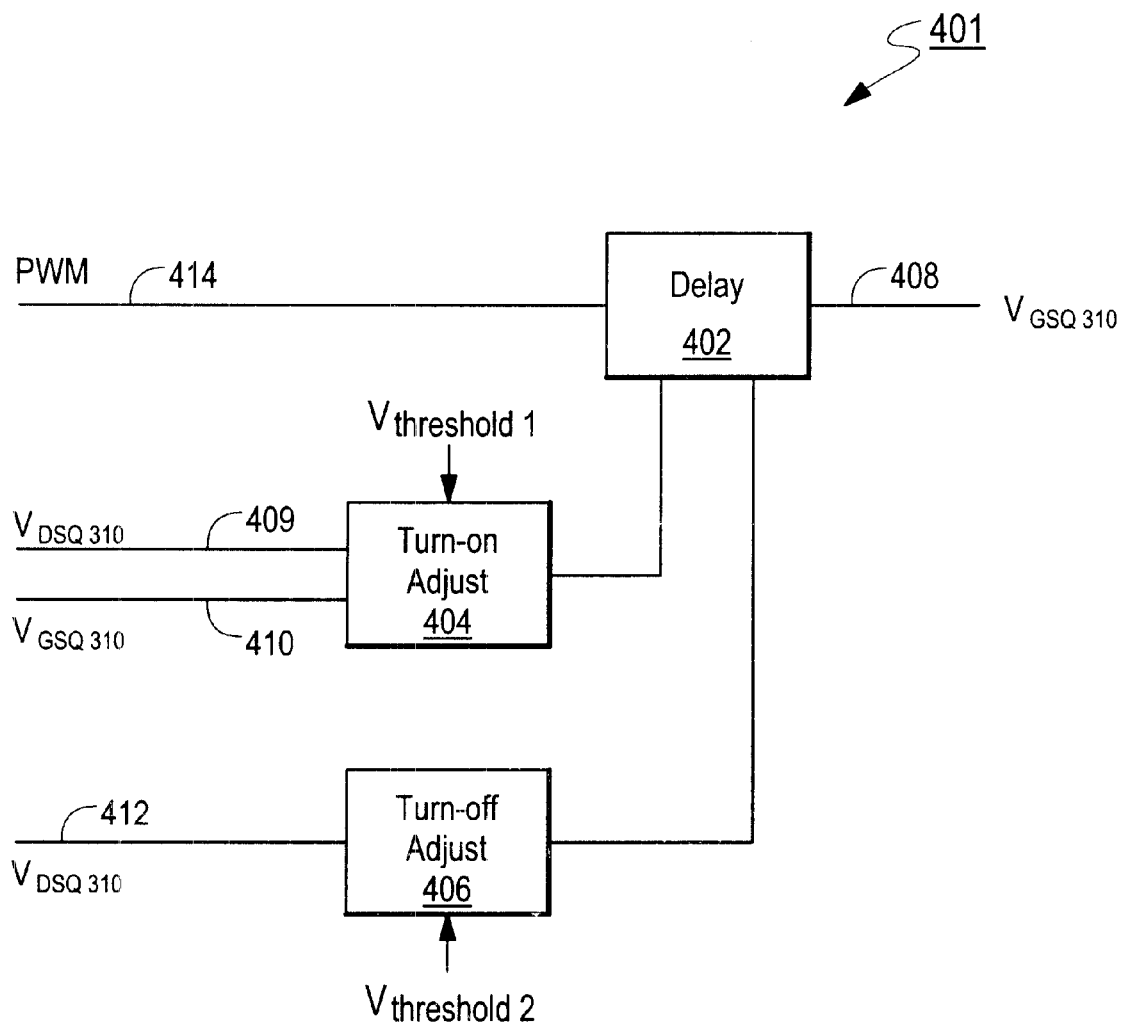
FIG. 4A is a block diagram of a first controller module suitable for use within the controller of FIG. 3.
Figure 4B:
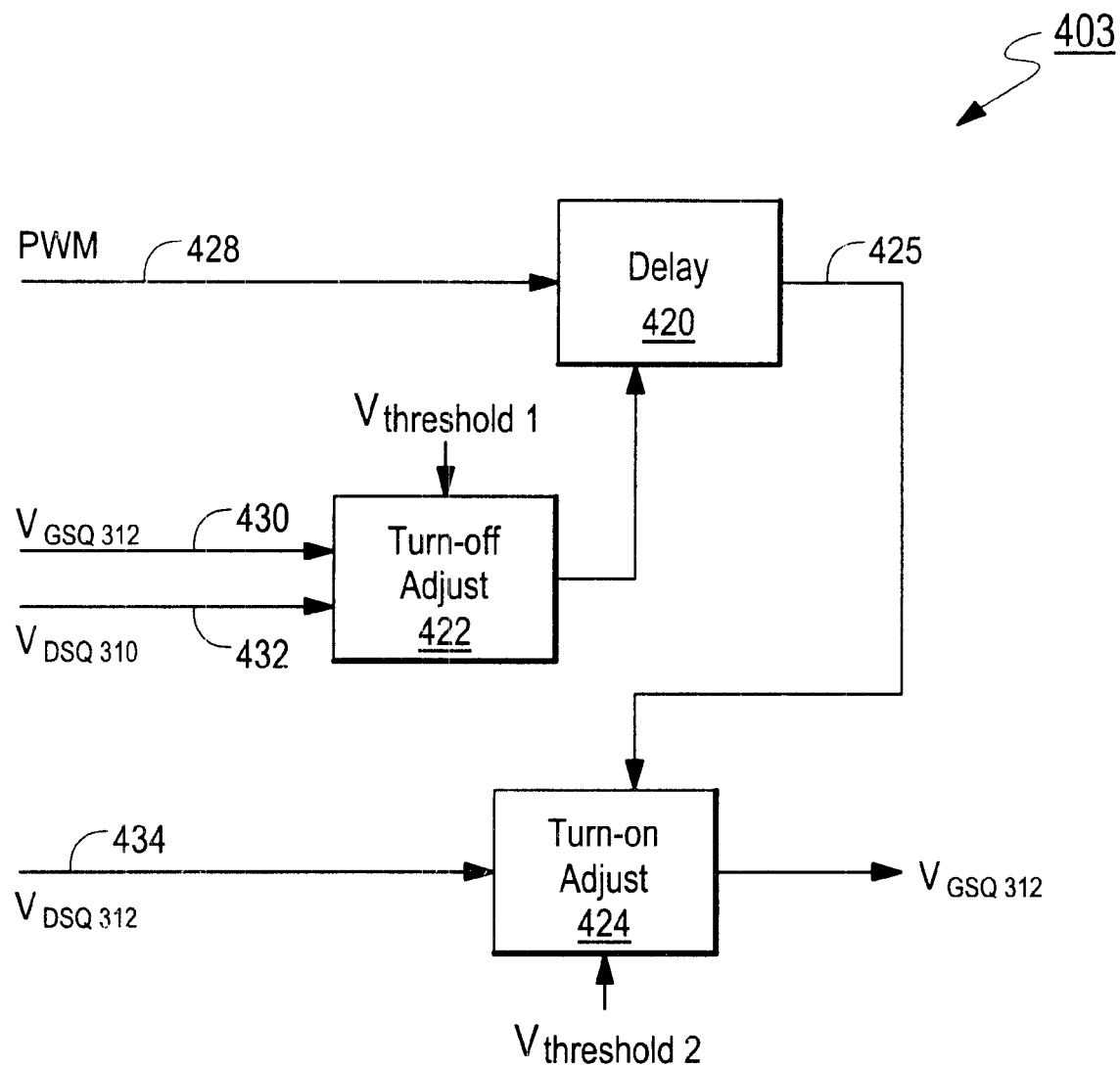
FIG. 4B is a block diagram of a second controller module suitable for use within the controller of FIG. 4.

The synchronous rectifiers are switched in a particular manner to avoid the losses caused by the rectifier reverse recovery and body diode conduction of the synchronous rectifiers. FIGS. 4A and 4B depict feedback controllers 401 and 403 that are contained within controller 300. Controllers 401 and 403 are configured and arranged to provide the necessary control signals, at the proper time, to the control terminals 319 and 321. As will be explained in more detail below, the controller 300, using controllers 401 and 403, provides for synchronous rectification of the power signal induced in the secondary coil 307 while avoiding the losses caused by the rectifier reverse recovery and the body diode conduction loss. The feedback controllers 401 and 403 predict the time at which the second and third switching modules should be turned-on or turned-off, and use the various input signals and the feedback control signals to optimally adjust these signals based on the input values of the previous switching cycle and the PWM signal pulse of the current switching cycle.

FIG. 4A depicts a feedback controller 401 suitable for providing a control signal 408 to the control terminal 319 of the second switching module 310. The feedback controller receives four input signals. The first signal is the pulse width modulator (PWM) signal pulses on input line 414. The second input is the voltage signal that is measured across the first and second terminals of the second switching module 310. The third input signal is the output control signal 408 generated by the first controller 401. The fourth input is also the voltage signal that is measured across the first and second terminals of the second switching module 310

The first controller 401 includes a delay module 402 that receives the PWM signal pulses on line 414 and provides output pulses that are time delayed versions of the PWM control signal 414. The turn-on module 404 receives the output control signal 408. The turn-on module 404 provides a signal to the delay module 402 such that the leading edge of the control signal is delayed a predetermined time from the leading edge of the PWM pulse to prevent the parasitic body diode from conducting. Similarly, a turn-off module 406 receives the voltage signal that is measured across the first and second terminals of the second switching module 310 on line 412 and provides a turn-off signal to the delay module 402 such that the trailing edge of the control pulse is time delayed from trailing edge of one or more of the input values to prevent the parasitic body diodes from conducting.

FIG. 4B depicts a feedback controller 403 suitable for providing a second control signal 426 to the control terminal 321 of the third switching module 312. The feedback controller 403 provides a second control signal 426 and receives four inputs. The first input is the PWM signal pulses on input line 428. The second input is the second control signal 426 from the feedback controller 403 on input line 430. The third input signal is the voltage signal that is measured across the first and second terminals of the second switch 310. The fourth input signal is the voltage signal that is measured across the first and second terminals of the third switch 312 on input line 434. The PWM signal pulse, i.e., input signal 428 is provided to a variable delay module 420. A turn-off adjust module 422 receives as inputs the second control signal 426 on input line 430 and the voltage signal that is measured across the first and second terminals of the second switch 310 on input line 432. The turn off module is configured and arranged to provide a turn-off adjustment signal to the variable delay module 420 such that the trailing edge of the second control signal is time delayed relative to the input signal indicative of the voltage magnitude across the second switch 310. A turn-on-logic module 424 receives as an input the voltage measured across the first and second terminals of the third switch 312 on line 434. The turn-on-logic module 424 is configured and arranged to provide the second control signal 426 to the control terminal of the third switch 312, such that the leading edge and trailing edge of the output signal are timed to minimize the body diode conduction during the switching operation of the third switch 312.

Figure 5A:
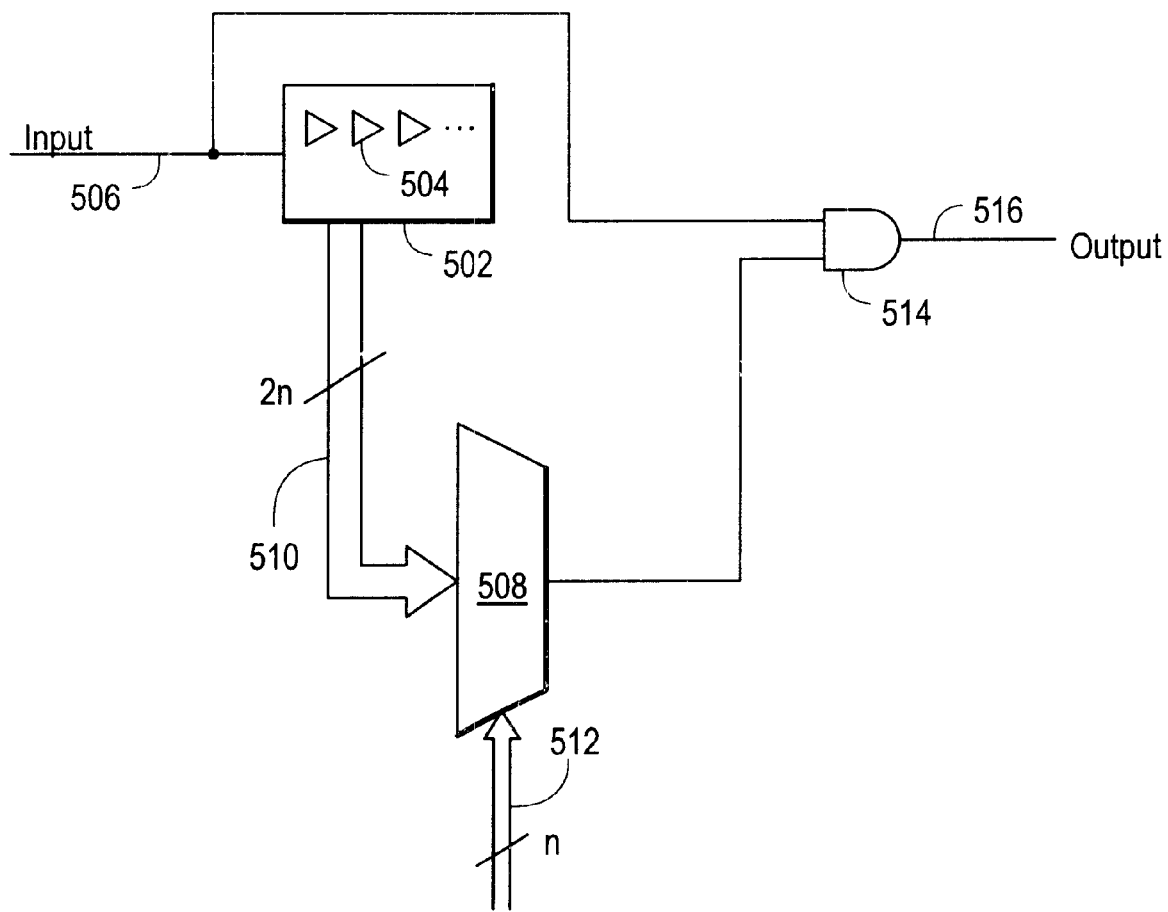
FIG. 5A is a schematic diagram of a delay circuit suitable for use in the delay module of FIG. 4A and 4B.
Figure 5B:
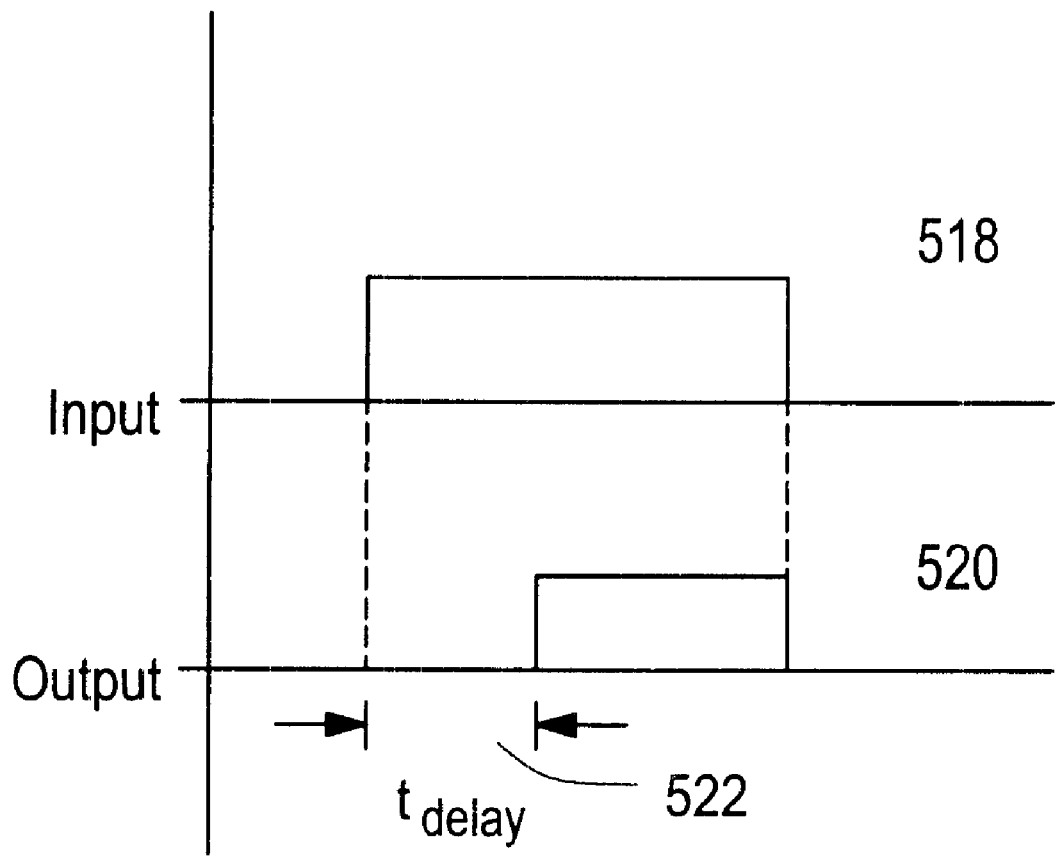
FIG. 5B is a graph of the input and output of the delay circuit depicted in FIG. 5A.

FIGS. 5A and 5B depict a schematic diagram of a programmable delay logic suitable for use as a portion of the delay module in FIGS. 4A and 4B, and waveforms depicting the operation of this programmable delay logic respectively. In particular, FIG. 5A depicts a programmable delay module 500 that includes a programmable delay block 502, a multiplexer 508, and an AND logic gate 514. The delay block 502 includes a plurality of delay 10 elements, each of which includes a corresponding output line.

Each of the plurality of output lines is provided to the multiplexer 508 as input lines 510. An input signal to the delay block 502 is delayed several nanoseconds for each delay element and the corresponding delayed output signal is provided on the corresponding output line. To provide a controlled turn-on time, the multiplexer 508 uses the value of the control bus 512 to select the particular output line from the delay element corresponding to the desired turn-on delay time. The AND logic gate 514 ensures that the delay is applied to rising edge of the input pulse only. As depicted in FIG. 5B the rising edge of the output pulse, waveform 520, is delayed from the rising edge of the input pulse, waveform 518, while the falling edge of the output waveform 520 is substantially concurrent to the falling edge of the input waveform 518. Thus, if the control bus is set to all "1"s the maximum delay is provided for, similarly, if the control bus is set to all "0"s there is practically no delay between the input and output waveforms. As will be described in more detail below, the trailing edge of a pulse may be adjusted and delayed as well with the addition of another multiplexer.

Figure 6:
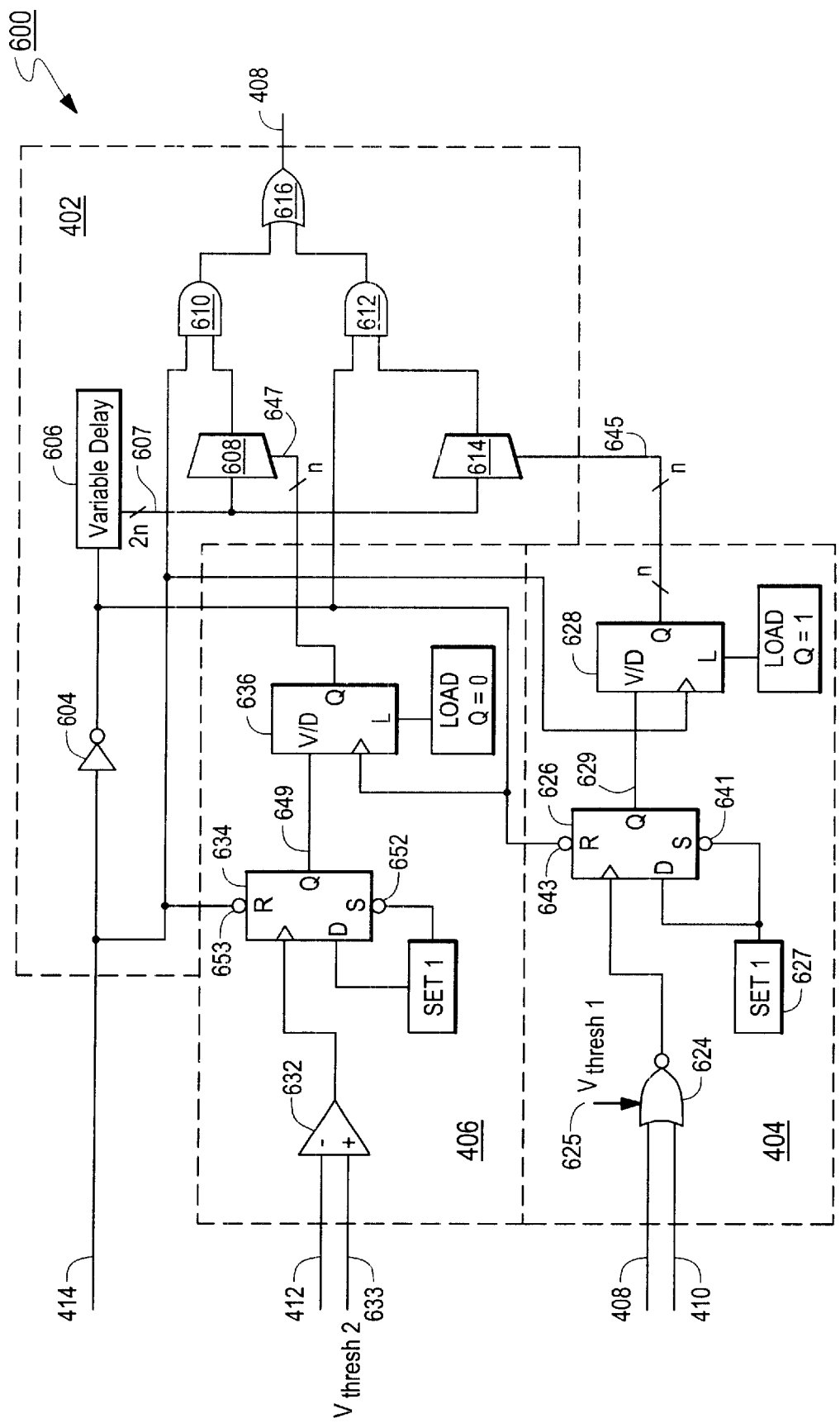
FIG. 6 is a schematic diagram of the first controller module depicted in FIG. 4A.

FIG. 6 depicts a plurality of circuit elements that provide the functionality of the feedback controller circuit 401 depicted in FIG. 4A. In particular, the delay module 402 includes an inverter 604 that inverts the PWM control signal received on line 414 and provides this inverted signal to a delay block 606. The plurality of 2^n output lines 607 of the delay block 606 are coupled to a turn-off multiplexer 608 and a turn-on multiplexer 614. The output of the turn-off and turn-on multiplexers 608 and 614 are coupled to output logic including first and second AND gates 610 and 612 respectively.

In operation, the delay block 606 provides a plurality of $2^n$ time delayed versions of the inverted PWM signal pulses via line 607 to the turn-off and turn-on multiplexers 608 and 614 respectively. An inverted and delayed PWM signal pulse is selected by the respective multiplexer corresponding to the value provided by the turn-on and turn-off mutiplexers 608 and 614 respectively. The selected PWM signal pulse is coupled therefrom to AND gates 610 and 612 respectively. The selected PWM signal pulse is coupled as an input to AND gate 610 and the inverted PWM control signal is coupled as an input to AND gate 612. The AND gate 610 adjusts the trailing edge of the first control signal by logically combining the PWM signal pulse and the inverted and delayed PWM control signal. Similarly, AND gate 612 adjusts the leading edge of the first control signal by logically combining the inverted PWM control signal and the inverted and delayed PWM control signal.

The turn-on multiplexer 614 receives the n control line inputs 645 from the turn-on signal adjust circuit 404. The turn-on adjust circuit 404 includes a first NOR gate 624 that receives a pair of inputs. One input is the first control signal feedback from line 408 and the other input is the signal indicative of the voltage amplitude across the first and second terminals of the second switch 310 on line 410. The NOR gate 624 is configured and arranged to have a threshold value set to a first turn-on threshold value 625, and in the illustrative embodiment the first threshold value 625 is 2 volts. The NOR gate 624 preferably includes a hysteresis to reduce to reduce the noise sensitivity of the inputs. The output of the first NOR gate 624 is provided to a turn-on D flip-flop 626. The turn-on D flip-flop 626 further receives a SET1 logic signal, i.e., a logic "high" or logic 1, applied to the S input 641 and the D input, and the inverse PWM signal being applied to the Reset input 643. Both the S input 641 and the Reset input 643 are active low inputs. The turn-on D flip-flop provides a signal from the Q-bar output 629 to the up/down select input of turn-on counter 628. Turn-on counter 628 further receives the PWM control signal as a clock input and a LOAD signal for counter set/reset operation. The turn-on counter 628 provides an n-bit control word output to the turn-on multiplexer 614 via line 645, for selection of one of the $2^n$ delayed and inverted PWM signals from the delay block 606.

At power up, the LOAD signal sets the output of the turn-on counter 628 to all "high". In this condition, the body diode of the second switch 310 will conduct. The 2 volt threshold of NOR gate 624 is selected to detect when the gate-to-source voltage and drain-to-source voltage of the second switching module 310 are both low. A high output from the NOR gate 624 indicates a delay that is too long in the turn-on signal and will cause the turn-on D flip-flop 626 to latch a "low" output on the Q bar output 629 causing the turn-on counter to decrement the output count, thereby reducing the delay. A low output from the NOR gate 624 will indicate a too short a delay in the turn-on signal and will cause the turn-on D flip-flop 626 to latch a "high" at the Q bar output 629 causing the turn-on counter 628 to increment the output count, thereby increasing the delay. In general, when the converter is operated at a constant load, the turn-on delay for the next cycle will be slightly too long and the NOR gate 624 will give a high output pulse shortening the delay. In this way the circuit dithers between two values, one that is slightly too long, and one that is very close to the optimum value.

The turn-off multiplexer 608 receives the n control line inputs on line 647 from the turn-off circuit 406. The turn-off circuit 406 includes a comparator 632 that receives a pair of inputs. One input is the signal indicative of the voltage across the first and second terminals of the second switch 310 on line 412. The other input is a first turn-off threshold voltage 633, which in the illustrated embodiment is 0.3 volts. The comparator 632 output is coupled to a turn-off D flop-flop 634 as the clock input thereto. The turn-off D flop-flop 634 further receives a SET1 logic signal applied to the S input 652 and the D input, and the PWM signal being applied to the R input 653. The turn-off D flip-flop 634 provides a signal from the Q output 649 to the up/down select input of turn-off counter 636. Turn-off counter 636 further receives the inverse PWM control signal as a clock input and a LOAD signal for counter set/reset operation. The turn-off counter 636 provides an n-bit control word output to the turn-off multiplexer 608, for selection of one of the $2^n$ delayed and inverted PWM signals from the delay block 606.

At power up, the LOAD signal sets the output of the turn-off counter 636 to all "low". In this condition, the body diode of the second switch 310 will conduct. The threshold value 633 of −0.3 volts is selected to detect conduction of the body diode of the second switch 310. The comparator 632 is a high-speed comparator and is used in conduction with the threshold value 633 to sense when the body diode of the second switching module 310 is conducting. During the turn-off of the second switching module 310 a constant current is flowing through either the channel or the body diode. The threshold voltage used as the second input of the comparator 632 is slightly negative to prevent false triggering when the channel is conducting but is set to less than the body diode forward voltage. The Q output 647 having been set "high" causing the turn-off counter 636 to increment the output count, increasing the delay. A low from the output of the comparator 632 indicates that the second switching module was turned off too late and a "0" is provided to the turn-off counter 636 and the turn-off delay is decreased. In general, when the converter is operated at a constant load, the turn-off delay for the next cycle will be slightly too short and the comparator 632 will give a high output pulse increasing the delay. In this way the circuit dithers between two values, one that is slightly too short, and one that is very close to the optimum value.

Figure 7A:
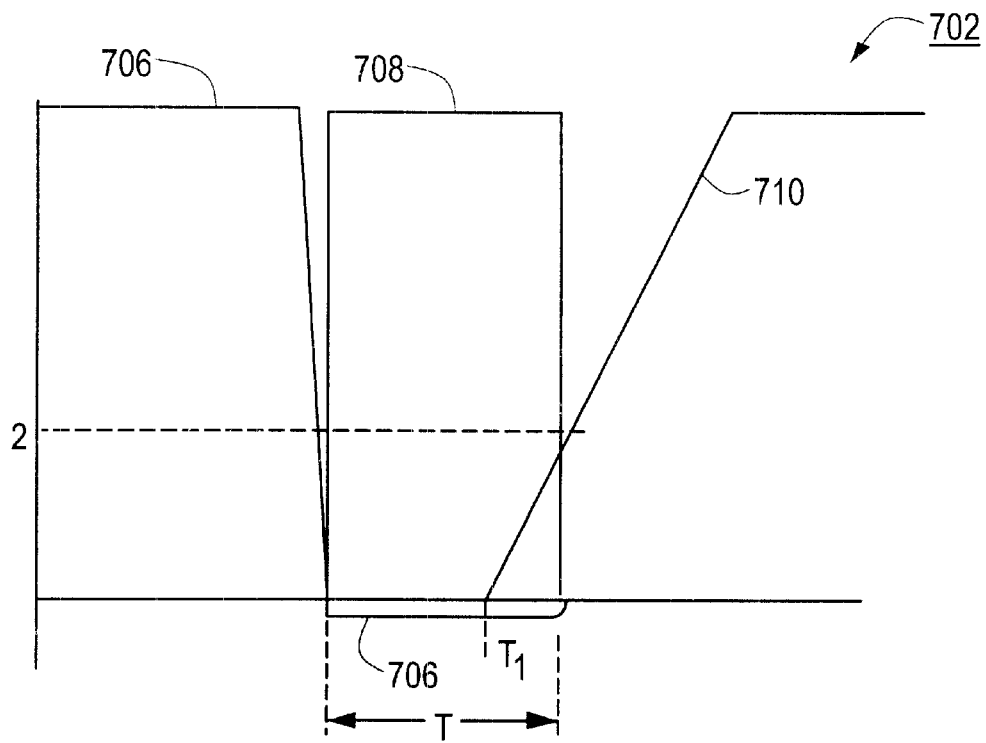
FIGS. 7A and 7B are graphs depicting the non-optimal and optimal turn-on operation of the first controller module depicted in FIG. 6.
Figure 7B:
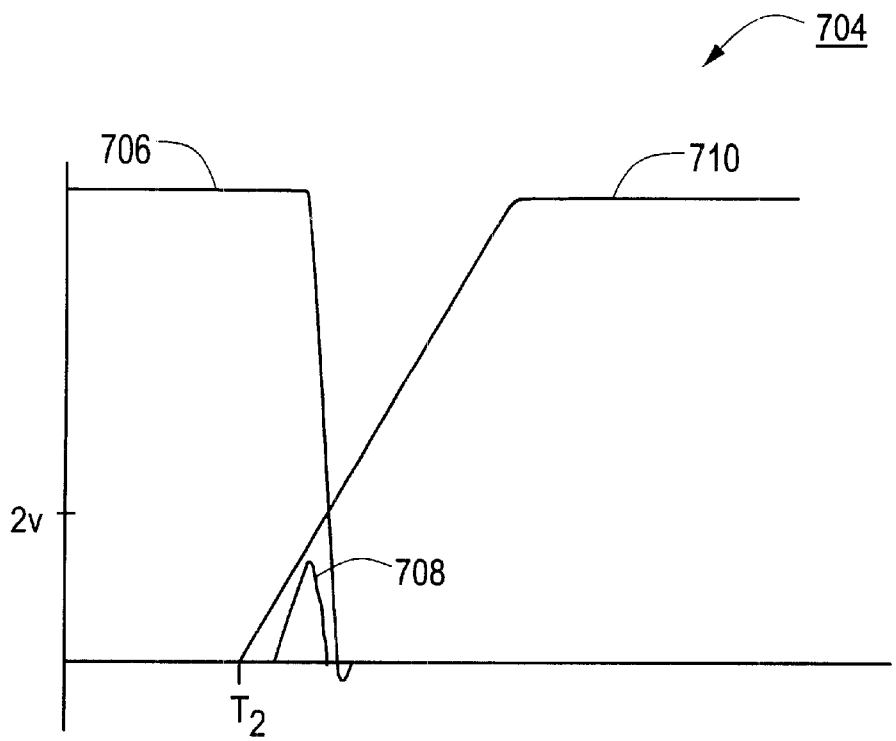

FIGS. 7A and 7B depict waveforms associated with the non-optimal turn-on signal and the optimal turn-on signal respectively. FIG. 7A depicts a graph 702 that includes three waveforms: the waveform 706 is indicative of the voltage signal that is measured across the first and second terminals of the second switching module 310. The waveform 710 is indicative of the first control signal 408 which begins at time T1 that is generated by the first controller 401, and the waveform 708 is indicative of the output of NOR gate 624. As depicted, the voltage signal that is measured across the first and second terminals of the second switching module 310, i.e., the drain to source voltage of the MOSFET switch, is less than zero indicating body diode conduction. As such, the output of NOR gate 624 remains high for a period T.

FIG. 7B depicts a graph 704 that includes the same three waveforms depicted in FIG. 7A, but under nearly optimal switching conditions. As depicted, waveform 710 that is indicative of the output control signal 408 optimal switching waveform has been shifted earlier in time and now begins at time T2, where T2<T1. This ensures that waveform 710 and waveform 706 cross the input threshold of the NOR gate 624 nearly simultaneously. Accordingly, the output of NOR gate 624, represented by waveform 708, is a very short pulse and that the waveform 706 drops below zero for a very short period as well. These two conditions are indicative that substantially little or no body diode conduction occurs in the second switch. As discussed above, the threshold selected for the NOR gate 624 is approximately 2 volts, which is the gate threshold value of the particular MOSFET switches used herein.

Figure 8A:
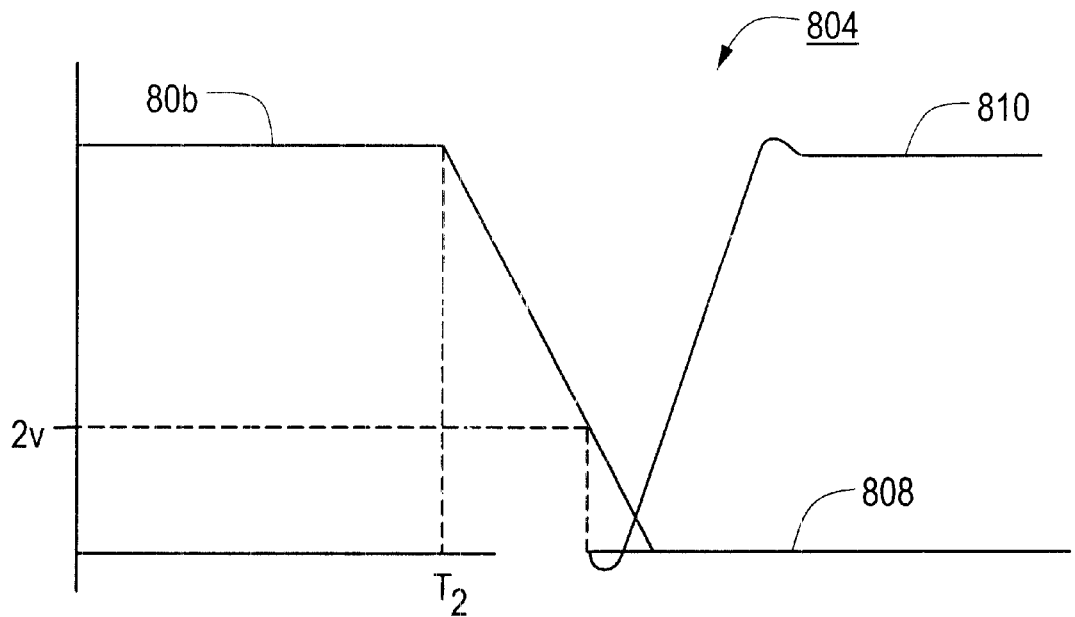
FIGS. 8A and 8B are graphs depicting the non-optimal and optimal turn-off operation of the first controller module depicted in FIG. 6.

FIG. 8A depicts a graph 802 including waveforms associated with the turn-off signal. Graph 802 depicts waveforms indicative of non-optimal trailing edge of the first control signal that will turn off the second switch 312. In particular, the control signal 806 is decreasing, beginning at time T1, as the waveform 810, which is indicative of the voltage signal that is measured across the first and second terminals of the second switching module 310, is increasing. In the example depicted in FIG. 8A, waveform 808, which is indicative of the output of comparator 632, is high during the period when waveform 810 is less than the input threshold 633. During this time the control signal waveform 806 is also less than the turn-on threshold of the second switch 310, and accordingly the body diode of the second electronic switch 310 is conducting.

Figure 8B:
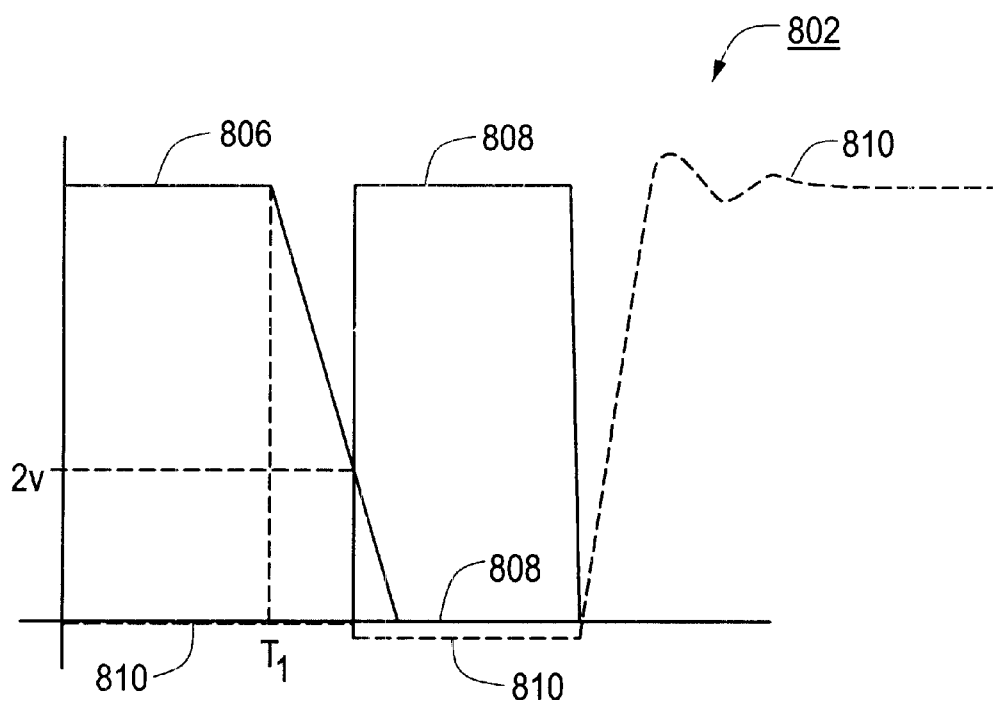

FIG. 8B the control signal represented by waveform 806 has been shifted to the right in time to time T2 where T2>T1. The control signal is shifted, such that the control signal reaches the threshold voltage of the second electronic switch 310 at the same time as the increasing voltage across the first and second terminals. The comparator 632 output, which is indicative of body diode conduction, is substantially zero, indicating that there is little or no body diode conduction.

Figure 9:
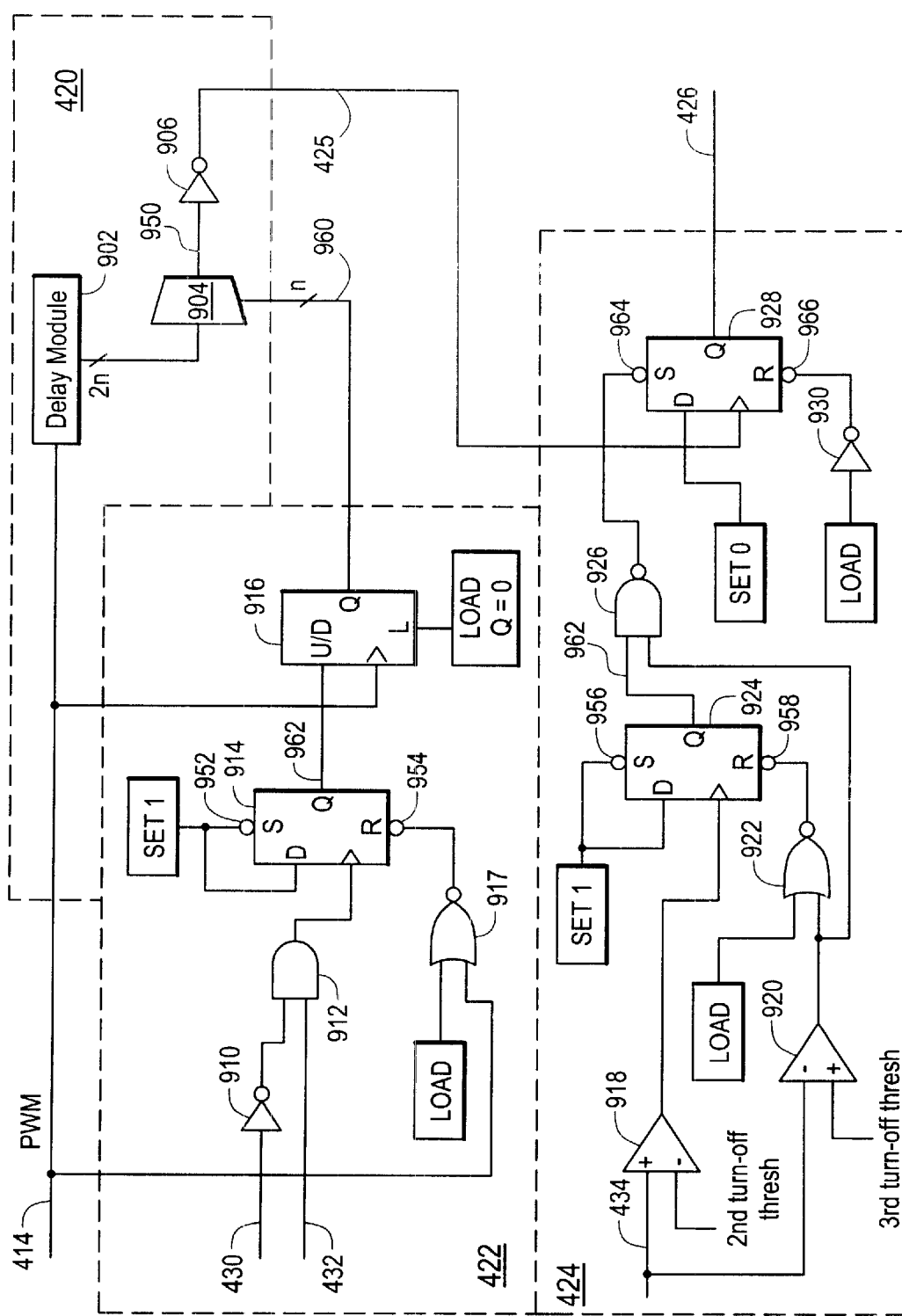
FIG. 9 is a schematic diagram of the second controller module depicted in FIG. 4B.

FIG. 9 depicts a plurality of circuit elements that provide the functionality of the feedback controller circuit 403 depicted in FIG. 4B for controlling the third switch 312. In particular, the feedback controller 403 includes a variable delay portion 420, the turn-off portion 422, and the logic-turn-on portion 424. The variable delay portion 420 receives the PWM control signal on line 428 and is coupled to a delay module 902. A turn-off multiplexer 904 receives the plurality of $2^n$ output signals from the delay module 902. The turn-off multiplexer 904 selects the one of the $2^n$ delayed PWM control signals corresponding to the value of the n select lines 960 received from the turn-off counter 916. The turn-off multiplexer provides a MUX_output signal on line 950 that is inverted by inverted by inverter 906, wherein an inverted_MUX_output signal is provided on line 425.

The turn-off adjustment portion 422 includes an inverter 910 that receives the fedback control signal 426 on input on line 430 and provides the inverted output to a first input of AND gate 912. AND gate 912 receives as a second input the signal indicative of the voltage amplitude across the first and second terminals of the second switch 310 on line 432. Both the inverter 910 and the AND gate 912 are configured and arranged to have a threshold of 2 volts. The output of AND gate 912 is provided as the clock input to turn-off D flip-flop 914. Turn-off D flip-flop 914 further receives the SET1 logic "high" or 1 signal coupled to the S input 952 and the output of NOR gate 917 to the R input 954. The OR gate 917 has two inputs. The first input is the PWM signal and the second input is the LOAD signal. The Q output 960 of the turn-off D flip-flop 914 is provided as the up/down select signal to turn-off counter 916. Turn-off counter 916 further receives as inputs the PWM signal as a clock input, and the LOAD signal provides for counter set/reset operation. As discussed above, the turn-off counter 916 provides n control lines 960 to the turn-off multiplexer 904 for selection of the particular delayed signal thereby.

The logic-turn-on adjustment portion 424 includes a comparator 918 that receives a pair of inputs. One input is the signal indicative of the voltage between the first and second terminals of the third switch 312, on line 434, and the other input is a first turn-off threshold value of 2.5 volts. A second comparator 920 also receives a pair of inputs. One input is the signal indicative of the voltage between the first and second terminals of the third switch 312, on line 434, and the other input is a second turn-off threshold value of –0.3 volts. In the illustrated embodiment, the first comparator 918 is low speed comparator and the second comparator 920 is a high-speed comparator. The output of the low speed comparator 918 is provided as the clock input of a pre-condition D flip-flop 924. The pre-condition D flip-flop 924 also receives as inputs the output of an NOR gate 922 coupled to the R terminal 958, which is an active low input, and the SET1 logic "high" or 1 signal is coupled to the S input 956. The NOR gate 922 has a first input coupled to the output of the high-speed comparator 920 and a second input coupled to the LOAD signal. The Q output 962 of the pre-conditioning D flip-flop 924 is coupled to one input of NAND gate 926. The NAND gate 926 has a second input coupled to the output of the second comparator 920. The output of AND gate 926 is provided as the S input 964 of a control D flip-flop 928. The control D flip-flop 928 also receives inputs that include the clock input coupled to the inverted $MUX_{13}$ output signal via line 425, a SETO signal, i.e., a logic "low" or 0 signal, coupled to the D input, and a LOAD signal inverted by inverter 930 coupled to R input 966.

During operation, the third switching module 312 is turned on after the transformer is reset and thus is independent of either the rising or falling edge of the PWM signal. The low speed comparator 918 is used to detect when the first to second terminal voltage of the third switching module 312 has risen above 2.5 volts which sets the first turn-on D flip-flop 924 that acts as a precondition latch. This enables the NAND gate 926 to pass the output of the second comparator 920 when it goes high. The second comparator 920 is used to detect when the body diode of the second switching module 310 begins to conduct, which signals the end of the transformer-reset period. This resets the preconditioning D flip-flop 924 and turns on the control latch turn-on D flip-flop 928. Although some conduction of the body diode of the third switching module 312 will occur, with the concomitant conduction loss, the loss is minimal.

The operation of the turn-off adjustment portion 422 is similar to the turn-on signal adjustment of the second switching module 310. The signal indicative of the voltage across the first and second terminals of the second switch 310 and the fedback second control signal 426 are provided on input lines 430 and 432. The fedback second control signal 426 provided on input line 430 is inverted by inverter 910 and provided as one input to AND gate 912. The second input of AND gate 912 is the signal indicative of the voltage across the first and second terminals of the second switching module 310 on line 432. The AND gate 910 is configured and arranged to have a 2 volt threshold. The AND gate 912 will synchronize the falling edge of the two input voltages, i.e., the falling edge of the gate voltage of the third switching module 312 and the falling edge of the drain-to-source voltage of the second switching module 310. A difference in the two input voltages will cause a changing signal to be applied to the clock input of the turn-off D flip-flip 914. This will cause the turn-off counter 914 to increment or decrement the output count to adjust the delay selected by the turn-off multiplexer 904. As described above with respect to FIG. 6, the turn-off counter will dither between two values, one that is slightly longer than optimum and one that is nearly optimum.

Figure 10A:
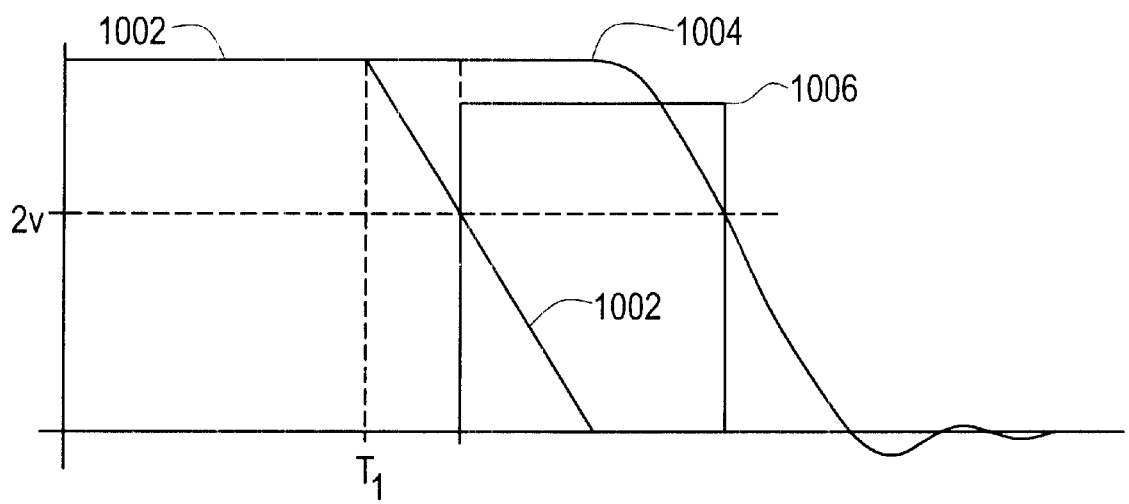
FIGS. 10A and 10B are graphs depicting the non-optimal and optimal turn-off operation of the second controller depicted in FIG. 9.
Figure 10B:
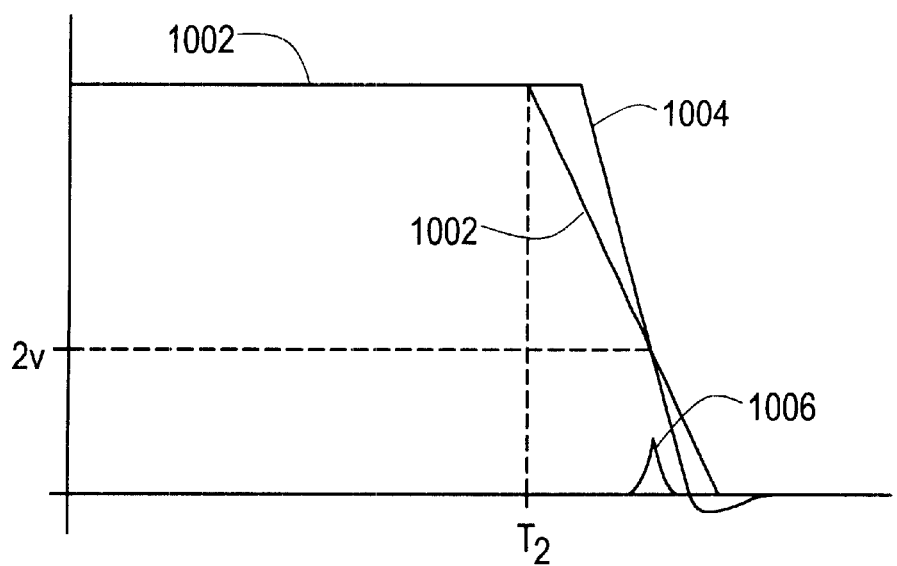

FIGS. 10A and 10B depict non-optimum and optimum trailing edge timing respectively. In particular, FIG. 10A depicts the trailing edge of waveform 1002 beginning at time T1 that is indicative of the control signal provided to the third switch 312, a trailing edge of waveform 1004 that is indicative of the voltage across the second switch 310, and waveform 1006 that is indicative of the output of AND gate 912. In particular, FIG. 10A depicts the trailing edges of waveforms 1002 and 1004 are separated in time and in which the output of AND gate 912 is high when waveform 1002 is below 2 volts and waveform 1004 is greater than 2 volts. During this period, the body diode will conduct.

FIG. 10B depicts the near optimal timing of the turn-off module 422. In particular, the trailing edge of the control signal provided to the second switch 310 is shifted in time and begins at time T2, where T2>T1, such that it crosses the threshold value of the AND gate 912 substantially simultaneously with the decreasing voltage across the second switch 310. There may be a small pulse provided by the AND gate 912 as indicated by waveform 1006. However, this pulse will not set the Q output of 914 because of the short duration, small amplitude, or both of the pulse.

It should be appreciated that the various threshold values used in the embodiments depicted herein are specific to the various devices. Accordingly, the threshold values used in other embodiments will be different and dependent upon the components used in those embodiments.

Those of ordinary skill in the art should further appreciate that variations to and modification of the above-described methods and apparatus for controlling a forward converter switching power supply can be made. Accordingly, the invention should be viewed as limited solely by the scope and spirit of the appended claims.

What is claimed is:

1. A control system for a switched mode power supply including first and second synchronous rectifiers, each synchronous rectifier including a parasitic body diode, and having a first terminal, a second terminal, and a control terminal, the switched mode power supply further including a pulse width modulator (PWM) providing a plurality of PWM signal pulses, each PWM signal pulse corresponding to a switching cycle, the control system comprising:

a first control module providing a first control signal having a turn-on portion and a turn-off portion to the control terminal of the first synchronous rectifier, the first control module receiving as input signals a first measurement signal indicative of the magnitude of the voltage between the first and second terminals of the first synchronous rectifier, a second measurement signal indicative of the magnitude of the first control signal, and a PWM signal pulse corresponding to the current switching cycle, the first control module configured and arranged to predict the optimal turn-on time of the first synchronous rectifier as a function of the first and second measurement signals of the previous switching cycle, and the pulse signal of the current switching cycle and to configure the first control signal to provide the turn-on portion of the first control signal to the control terminal of the first synchronous rectifier accordingly, the first control module further configured and arranged to predict the optimal turn-off time for the first synchronous rectifier as a function of the first measurement signal of the previous switching cycle, and the PWM pulse signal of the current switching cycle and to configure the first control signal to provide the turn-off portion of the first control signal to the control terminal of the first synchronous rectifier wherein the conduction of the parasitic body diode of the first synchronous rectifier is substantially minimized.

2. The control system of claim 1 wherein the first control module includes:

a first variable delay module receiving as an input the PWM signal pulse, the first delay module configured and arranged to provide as an output a plurality of delayed PWM signal pulses;

a first turn-on module receiving as a first input the first measurement signal and receiving as a second input the second measurement signal, the first turn on module coupled to the delay module, and the first turn-on module configured and arranged to predict the turn-on delay such that the first synchronous rectifier is turned on as the first measurement signal equals zero, the first turn-on module providing the first variable delay module with a first turn-on selection signal to select one of the plurality of delayed PWM signal pulses to provide the selected PWM signal pulse as the first turn-off portion of the first control signal to turn the first synchronous rectifier on at the predicted time, wherein the body diode conduction of the first synchronous rectifier is minimized;

a first turn-off module receiving as an input the first measurement signal, the first turn-off module coupled to the first delay module, the first turn-off module configured and arranged to predict the turn-off time of the first synchronous rectifier such that the first synchronous rectifier is turned off as the first measurement signal drops below the first predetermined threshold, the first turn-off module providing the first variable delay module with a first turn-off selection signal to select one of the plurality of delayed PWM signal pulses as the turn-off portion of the first control signal to turn the first synchronous rectifier off at the predicted time, wherein the body diode conduction of the first synchronous rectifier is minimized.

3. The control system of claim 2 wherein the first turn-on module includes:

a first turn-on threshold detector having first and second inputs coupled to the first control signal and to the first measurement signal and configured and arranged to detect when the first and second inputs are above a first predetermined turn-on threshold, the first threshold detector providing as an output a first turn-on threshold signal;

a first latch coupled to the output of the first threshold detector, the first latch operative to provide a latched first threshold output;

a turn-on counter module providing a first turn-on output count signal, the first counter receiving the latched first turn-on threshold output count signal and responsive to the latched first turn-on threshold count output signal by incrementing and decrementing a turn-on output count signal appropriately;

a first turn-on multiplexer receiving the first turn-on output count signal from the first turn-on counter, the first turn-on multiplexer coupled to the first variable delay module and receiving the plurality of variable delayed PWM signals, the first turn-on multiplexer being responsive to the first turn-on output count signal by selecting one of the plurality of variable delayed PWM signals and providing the selected variable delayed PWM signal as the first turn-on portion of the first control signal.

4. The control system of claim 2 wherein the first turn-off module includes:
- a first turn-off threshold detector having a first input coupled to the second threshold value and a second input coupled to the first measurement signal, the first turn-off threshold detector operative to detect when the second input has fallen below the second threshold value and to provide a first turn-off threshold output signal;
- a latch coupled to the first turn-off threshold detector and operative to provide a latched first turn-off threshold output signal;
- a first turn-off counter module providing a first turn-off output count signal, the first turn-off counter module receiving the latched first turn-off threshold output signal and responsive to the latched first turn-off threshold output signal by incrementing and decrementing a turn-off output count signal appropriately;
- a first turn-off multiplexer receiving the first turn-off output count signal from the first turn-off counter, the turn-off multiplexer coupled to the first variable delay module and receiving the plurality of variable delayed PWM signals, the first turn-off multiplexer being responsive to the first turn-off output count signal by selecting one of the plurality of variable delayed PWM signals and providing the selected variable delayed module output as the first turn-off portion of the first control signal.

5. A control system for a switched mode power supply including first and second synchronous rectifiers, each synchronous rectifier including a parasitic body diode, and having a first terminal, a second terminal, and a control terminal, the switched mode power supply further including a pulse width modulator (PWM) providing a plurality of PWM signal pulses, each PWM signal pulse corresponding to a switching cycle, the control system comprising:
- a first control module providing a first control signal having a turn-on portion and a turn-off portion to the control terminal of the first synchronous rectifier, the first control module receiving as input signals a first measurement signal indicative of the magnitude of the voltage between the first and second terminals of the first synchronous rectifier, a second measurement signal indicative of the magnitude of the first control signal, and a PWM signal pulse corresponding to the current switching cycle, the first control module configured and arranged to predict the optimal turn-on time of the first synchronous rectifier as a function of the first and second measurement signals of the previous switching cycle and the pulse signal of the current switching cycle, and to configure the first control signal to provide the turn-on portion of the first control signal to the control terminal of the first synchronous rectifier accordingly, the first control module further configured and arranged to predict the optimal turn-off time for the first synchronous rectifier as a function of the first measurement signal of the previous switching cycle and the PWM pulse signal of the current switching cycle, and to configure the first control signal to provide the turn-off portion of the first control signal to the control terminal of the first synchronous rectifier wherein the conduction of the parasitic body diode of the first synchronous rectifier is substantially minimized;
- a second control module to provide a second control signal having a second turn-on portion and a second turn-off portion, the second control module providing the second control signal to the control electrode of the second synchronous rectifier, the second control module receiving as inputs a third measurement signal indicative of the magnitude of the voltage between the first and second terminals of the second synchronous rectifier, a fourth measurement signal indicative of the magnitude of the voltage of the second control signal, a PWM signal corresponding to the current switching cycle, and the first measurement signal, the second control module configured and arranged to predict the optimal turn-off time for the second synchronous rectifier and to configure the second control signal to provide the turn-off portion of the second control signal to the control terminal of the second synchronous rectifier as a function of the first and third measurement signals of the previous switching cycle and the pulse signal of the current switching cycle, the second control module further configured and arranged to detect when the second measurement signal has first increased above a first threshold level and has subsequently decreased to a value less than a second threshold level whereupon the second control module configures the second control signal to provide the turn-on portion of the second control signal to the control terminal of the second synchronous rectifier.

6. The control system of claim 5 wherein the first control module includes:
- a first variable delay module receiving as an input the PWM signal pulse, the first delay module configured and arranged to provide as an output a plurality of delayed PWM signal pulses;
- a first turn-on module receiving as a first input the first measurement signal and receiving as a second input the second measurement signal, the first turn on module coupled to the delay module, and the first turn-on module configured and arranged to predict the turn-on delay such that the first synchronous rectifier is turned on as the first measurement signal equals zero, the first turn-on module providing the first variable delay module with a first turn-on selection signal to select one of the plurality of delayed PWM signal pulses to provide the selected PWM signal pulse as the first turn-off portion of the first control signal to turn the first synchronous rectifier on at the predicted time, wherein the body diode conduction of the first synchronous rectifier is minimized;
- a first turn-off module receiving as an input the first measurement signal, the first turn-off module coupled to the first delay module, the first turn-off module configured and arranged to predict the turn-off time of the first synchronous rectifier such that the first synchronous rectifier is turned off as the first measurement signal drops below the first predetermined threshold, the first turn-off module providing the first variable delay module with a first turn-off selection signal to select one of the plurality of delayed PWM signal pulses as the turn-off portion of the first control signal to turn the first synchronous rectifier off at the predicted time, wherein the body diode conduction of the first synchronous rectifier is minimized.

7. The control system of claim 6 wherein the first turn-on module includes:
- a first turn-on threshold detector having first and second inputs coupled to the first control signal and to the first measurement signal and configured and arranged to detect when the first and second inputs are above a first predetermined turn-on threshold, the first threshold detector providing as an output a first turn-on threshold signal;

a first latch coupled to the output of the first threshold detector, the first latch operative to provide a latched first threshold output;

a turn-on counter module providing a first turn-on output count signal, the first counter receiving the latched first turn-on threshold output count signal and responsive to the latched first turn-on threshold count output signal by incrementing and decrementing a turn-on output count signal appropriately;

a first turn-on multiplexer receiving the first turn-on output count signal from the first turn-on counter, the first turn-on multiplexer coupled to the first variable delay module and receiving the plurality of variable delayed PWM signals, the first turn-on multiplexer being responsive to the first turn-on output count signal by selecting one of the plurality of variable delayed PWM signals and providing the selected variable delayed PWM signal as the first turn-on portion of the first control signal.

8. The control system of claim 6 wherein the first turn-off module includes:

a first turn-off threshold detector having a first input coupled to the second threshold value and a second input coupled to the first measurement signal, the first turn-off threshold detector operative to detect when the second input has fallen below the second threshold value and to provide a first turn-off threshold output signal;

a latch coupled to the first turn-off threshold detector and operative to provide a latched first turn-off threshold output signal;

a first turn-off counter module providing a first turn-off output count signal, the first turn-off counter module receiving the latched first turn-off threshold output signal and responsive to the latched first turn-off threshold output signal by incrementing and decrementing a turn-off output count signal appropriately;

a first turn-off multiplexer receiving the first turn-off output count signal from the first turn-off counter, the turn-off multiplexer coupled to the first variable delay module and receiving the plurality of variable delayed PWM signals, the first turn-off multiplexer being responsive to the first turn-off output count signal by selecting one of the plurality of variable delayed PWM signals and providing the selected variable delayed module output as the first turn-off portion of the first control signal.

9. The control system of claim 5 wherein the second control module includes:

a delay module receiving as an input the PWM pulse signals of the pulse width modulator providing as an output a plurality of variable delayed PWM pulse signals;

a turn-off module receiving as a first input the first control signal and receiving as a second input the first measurement signal, the turn-off module configured and arranged to predict the turn-off time of the second synchronous rectifier such that the second synchronous rectifier is turned off as the first measurement signal is less than a first predetermined turn-off threshold, the turn-off module providing the second delay module with a delay selection signal to configure the delayed PWM pulse signal as the turn-off portion of the second control signal and to provide the turn-off portion of the second control signal to the control terminal of the second synchronous rectifier to turn the second synchronous rectifier off at the predicted time, wherein the body diode conduction of the second synchronous rectifier is minimized;

a turn-on module receiving as an input the third measurement signal, the second turn-on module coupled to the delay module, the turn-on module configured and arranged such that the second control signal turns on the second synchronous rectifier as the third measurement signal has risen above a first predetermined turn-on threshold and subsequently drops below a second predetermined turn-on threshold, the second turn-on module providing the turn-on portion of the second control signal to turn the second synchronous rectifier on at the predicted time, wherein the body diode conduction of the second synchronous rectifier is minimized.

10. The control system of claim 9 wherein the second turn-off module includes:

a turn-off threshold detector having a first input coupled to the second control signal and a second input coupled to the first measurement signal, the turn-off threshold detector operative to detect when the second control signal is below a predetermined third turn-off threshold and the first measurement signal is above the predetermined third turn-off threshold and to provide a second threshold output signal;

a turn-off latch coupled to the turn-off threshold detector and operative to provide a latched second threshold output signal;

a turn-off counter module providing a turn-off output count signal, the turn-off counter module receiving the latched second threshold output and responsive to the latched second threshold output by incrementing and decrementing a second turn-off output count signal appropriately;

a turn-off multiplexer receiving the second turn-off output count signal from the second turn-off counter, the turn-off multiplexer coupled to the variable delay module and receiving the plurality of variable delayed PWM signals, the turn-off multiplexer being responsive to the turn-off output count signal by selecting one of the plurality of variable delayed PWM signals and providing the selected variable delayed module output as the turn-off portion of the first control signal.

11. The control system of claim 9 wherein the turn-on module includes:

a second turn-on threshold detector having a first input coupled to a second turn-on threshold value, a second input coupled to the third measurement signal, and a third input coupled to a third turn-on threshold detector, the second turn-on threshold detector operative to detect when the second input has risen above the first turn-on threshold and subsequently fallen below the second turn-on threshold and to provide the turn-on portion of the second control signal.

* * * * *